April 7, 1931.　　　C. O. RHYS　　　1,799,392

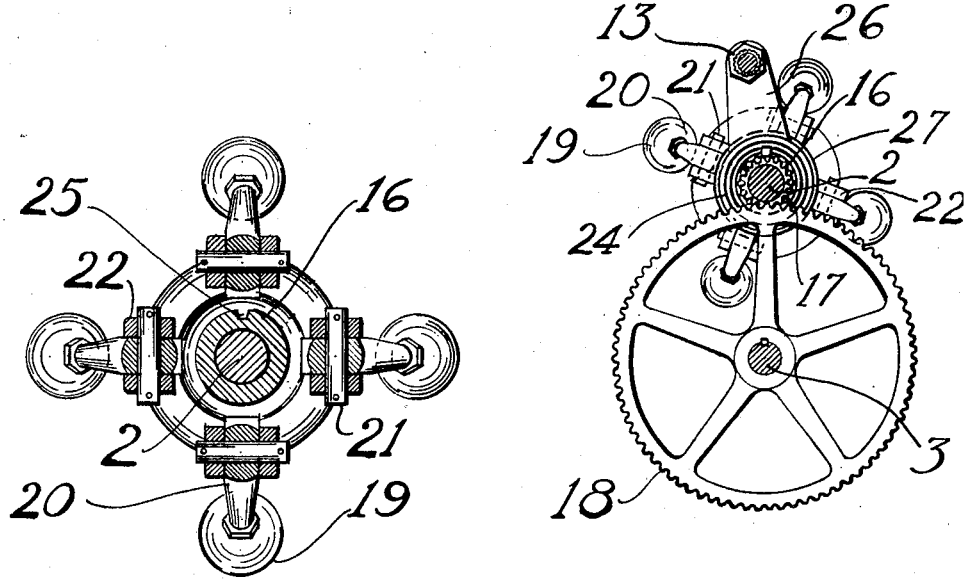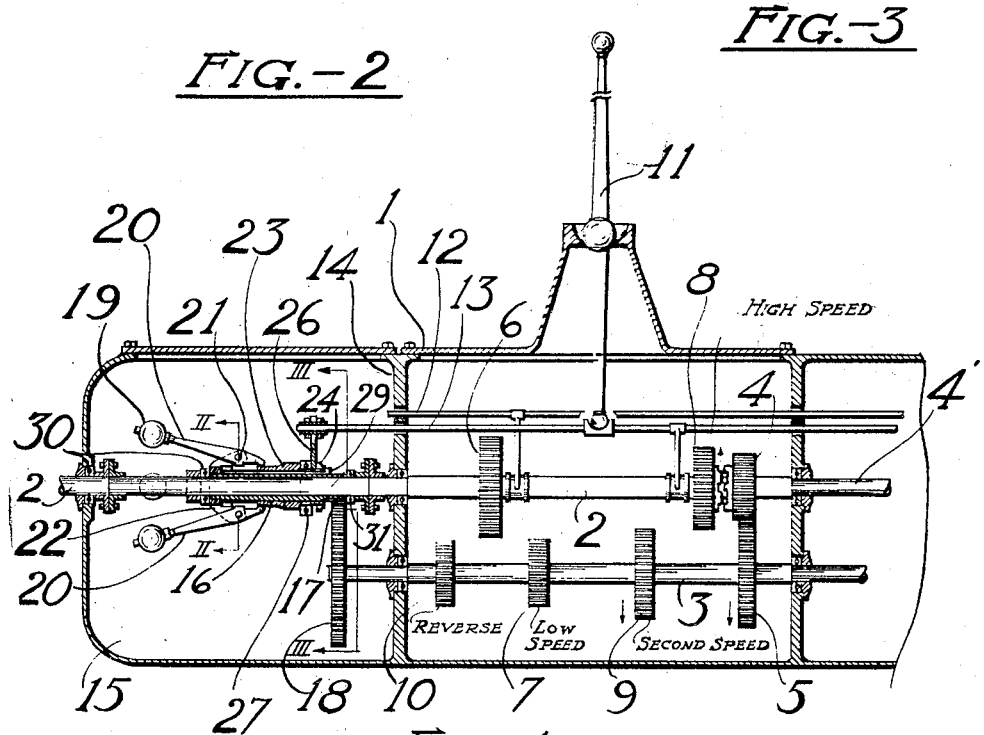

TRANSMISSION GEAR SPEED EQUALIZING MEANS

Filed May 31, 1928　　　2 Sheets-Sheet 2

Inventor
Cyril O. Rhys
By his Attorney

Patented Apr. 7, 1931

1,799,392

UNITED STATES PATENT OFFICE

CYRIL O. RHYS, OF WESTFIELD, NEW JERSEY, ASSIGNOR TO STANDARD OIL DEVELOPMENT COMPANY, A CORPORATION OF DELAWARE

TRANSMISSION-GEAR SPEED-EQUALIZING MEANS

Application filed May 31, 1928. Serial No. 281,858.

This invention relates to improvements in means for facilitating the shifting of gears in transmissions, especially those used on automobiles. In accordance with the invention, the gears to be meshed are brought to substantially the same peripheral speed by a speed responsive device, preferably a centrifugal governor. The invention will be fully understood from the following description read in connection with the accompanying drawings, in which Fig. 1 is a vertical section through a transmission provided with the improved gear speed equalizing means;

Fig. 2 is an enlarged transverse section on line II—II, Fig. 1;

Fig. 3 is an enlarged transverse section on line III—III, Fig. 1;

Figure 4:
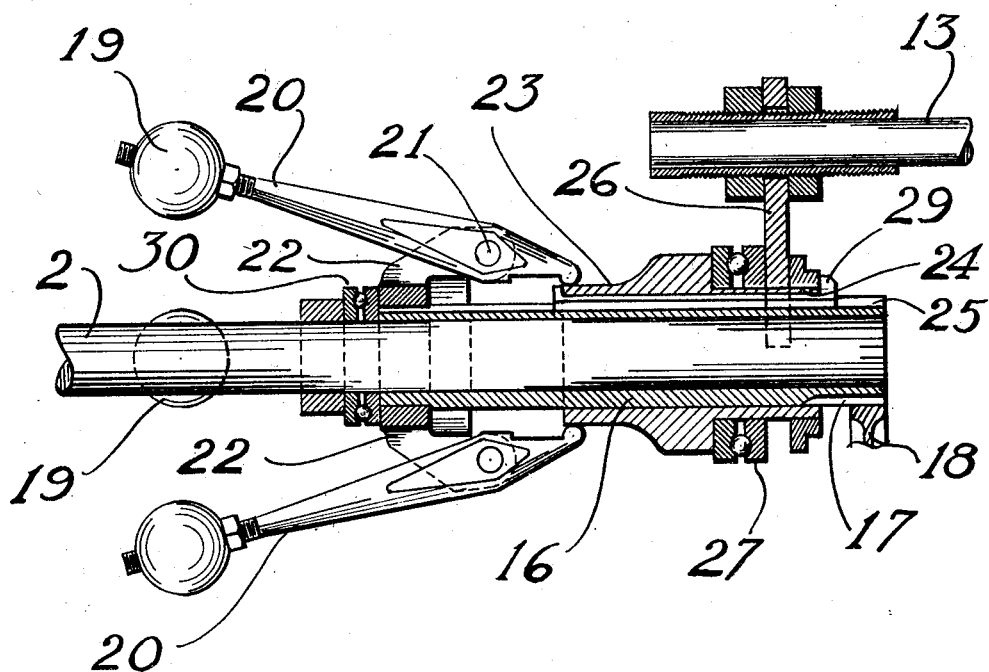
Fig. 4 is an enlarged sectional view of the cam member and its associated parts.
Figure 5:
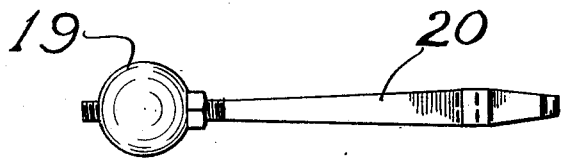
Fig. 5 is an elevation of one of the supporting arms.

Referring to the drawing, 1 denotes a gear case in which is mounted a main drive shaft 2 and a counter-shaft 3. The transmission chosen for illustration is of the selective three-speed-and-reverse type in which the gears on the main drive shaft are moved axially to engage the gears on the counter-shaft. It will be understood, however, that the invention is not limited to this type of transmission.

As in usual practice, the driving gear 4 on the clutch shaft 4' is always in mesh with the large gear 5 on the counter-shaft 3. Gears 6 and 7 are adapted to be engaged to give the low or first speed, gears 8 and 9 to give the intermediate or second speed, gears 8 and 4 to give the high or third speed, and gears 10 and 6, through an idler gear (not shown) to reverse. A gear shift lever 11 and a pair of controlling rods 12 and 13 of the usual type are provided for shifting the gears on the drive shaft 2.

The present invention consists in the combination of transmission mechanism with a centrifugal governor and its connections, now to be described. A partition 14 divides the gear case 1 to form a chamber 15. The main drive shaft 2 extends through this chamber and counter-shaft 3 is extended into it for a short distance. A sleeve 16 is mounted for independent rotation on the main drive shaft and is connected by a terminal gear 17, with a gear 18 on the end of the counter-shaft projecting into chamber 15. The terminal gear 17 is preferably formed by cutting away portions of the end of the sleeve.

The counter-shaft 3, when it is connected to the source of power, drives the sleeve 16. Conversely the counter-shaft, when disconnected from the source of power, is rotated by the sleeve. Varying angular velocity is imparted to the sleeve by means of weights, such as massive balls 19 adjustably mounted on arms 20. These arms are pivotally mounted on pins 21 secured in a spider 22 which encircles and is secured to the sleeve. Four balls are shown but the number may be varied. Preferably the balls are symmetrically spaced with reference to the shaft 2 and their distance from their centers of rotation should be equal.

An annular cam member 23, having a reduced end 24, is slidable along and rotatable with sleeve 16. One of the gear teeth cut into the sleeve is preferably extended along it to form a guideway 25 on which the cam member slides.

A finger 26 is adjustably mounted on an extension of shift rod 13 and engages a ball-bearing thrust member 27, mounted on the reduced end 24 of the cam member. A stop 29 and the spider 22 limit the sliding motion of the cam member. In order to reduce friction, it is desirable to provide ball-bearings 30 and 31 at the ends of sleeve 16.

The operation of the device is as follows: Assuming that it is desired to shift from third speed to second speed, the clutch is depressed and the gear shift lever 11 is moved to shift the rod 13 to the left. This causes finger 26 to move the thrust bearing 27 and the cam member 23 so that the inclined surface of the latter engages the inner ends of arms 20 on which the centrifugal balls 19 are mounted. As the balls are brought nearer to the drive shaft, their moment of inertia about the shaft is reduced and there is a corresponding increase of velocity. At this time, the counter-shaft 3 is running freely since the clutch is out. Accordingly, the change of speed imparted to the sleeve 16 is transmitted through the gears 17 and 18 to the counter-shaft 3. The mass of the balls and their arrangement is so calculated that the speed of the counter-shaft will be increased to bring the second speed gear up to the same peripheral velocity as the third speed gear. Under these conditions, the gears will mesh without any difficulty.

On shifting from second to third speed, the motion is reversed. For, as soon as the cam surface is removed from beneath the ends of the arms carrying the balls, they fly out from the shaft under the action of centrifugal force. The resulting increase of the moment of inertia correspondingly reduces the velocity of the sleeve 16 and so slows down the counter-shaft.

While only the equalization of gear speed for the third-to-second and second-to-third shift has been described, it will be understood that the same principle is applicable to the other shifts.

While the use of a cam member for adjusting the speed responsive devices is convenient, there are many other mechanical equivalents for the cam member. It will be understood, that any device which will move the centrifugal masses toward the shaft in a regulated manner, will serve the desired purpose.

Various changes and alternative arrangements may be made within the scope of the appended claims, in which it is my intention to claim all novelty inherent in the invention as broadly as the prior art permits.

I claim:

1. In combination with gears mounted to be shifted into engagement, gear speed equalizing mechanism comprising a rotatably mounted member, control means thereon adapted to assume a predetermined radial position under the influence of centrifugal force when the gears are disengaged, means for varying said position as the gears are shifted for engagement, thereby varying the speed of rotation of the rotatable member, and means for transmitting this variation to one of the gears so as to substantially equalize the peripheral speeds of the gears to be engaged.

2. In a transmission comprising gears slidably mounted on a main drive shaft and gears rigidly mounted on a counter-shaft, a gear shift lever, a sleeve rotatably mounted on the main drive shaft, a driving connection between said sleeve and said counter-shaft, centrifugal means mounted on the sleeve, and means operated by the gear shift lever for varying the position of said centrifugal means.

3. Apparatus according to claim 2, in which the centrifugal means is in the form of massive balls mounted on arms pivotally supported on the sleeve.

4. Apparatus according to claim 2, in which the position of the centrifugal means is varied by means of a cam surface actuated by the gear shift lever.

5. In a transmission comprising a main drive shaft and a counter-shaft, a sleeve mounted on the main drive shaft for rotation independent thereof, a gear mounted on the counter-shaft and driven by said sleeve, a shift rod, a cam member slidably mounted on said sleeve, a finger connected to the shift rod and adapted to slide the cam member along the sleeve, a support mounted on the sleeve, arms pivotally mounted for centrifugal motion on said support, weights carried by the arms, the ends of said arms opposite the weights being adapted to engage the cam member.

6. Gear speed equalizing mechanism, comprising a plurality of shafts, gears associated therewith shiftable into mesh while rotating, radially adjustable weights rotatably associated with one of the shafts, means for adjusting the weights to vary their speed of rotation, and means for driving the other shaft by the weights.

7. In gear shifting mechanism, driving gears rotatably mounted, a set of connected driven gears rotatably mounted, shift means for effecting successive engagement of the driving and driven gears, a governor mounted for rotation and having a driving connection with the driven gears, the governor including radially movable weights, and means operated by the shift means for varying the radial position of the weights whereby the peripheral velocity of the driven gears acquired during engagement of the set with a driving gear is altered after disengagement of the gears.

8. In gear shifting mechanism, driving gears rotatably mounted, a set of driven gears of varying sizes rotatably mounted, shift means for effecting successive engagement of the driving and driven gears, a governor mounted for rotation and having a driving connection with the driven gears, the governor including radially movable weights, and means operated by the shift means for varying the radial position of the weights whereby the peripheral velocity of the driven gears acquired during engagement of the set with a driving gear is altered after disengagement of the gears to substantially peripheral velocity of a driving gear to be engaged therewith.

9. In gear shifting mechanism, driving gears rotatably mounted, a set of driven gears of varying sizes rotatably mounted, shift means for effecting successive engagement of the driving and driven gears, a governor mounted for rotation and having a driving connection with the driven gears, the governor including radially movable weights, and cam means operated by the shift means for varying the radial position of the weights whereby the peripheral velocity of the driven gears acquired during the engagement of the set with a driving gear is altered after disengagement of the gears to substantially the peripheral velocity of the driving gear to be engaged therewith.

10. In gear shifting mechanism, driving gears rotatably mounted, a set of driven gears of varying sizes rotatably mounted, shift means for effecting successive engagement of the driving and driven gears, a governor mounted for rotation and having a driving connection with the driven gears, the governor including radially movable weights, and means operated by the shift means for varying the radial position of the weights during the interval between the disengagement of a pair of gears and the engagement of another pair of gears, whereby the peripheral velocities of the last mentioned gears are substantially equalized.

CYRIL O. RHYS.